US008573641B2

(12) United States Patent
Marable et al.

(10) Patent No.: US 8,573,641 B2
(45) Date of Patent: Nov. 5, 2013

(54) AIRBAG HAVING A PRESSURE RESPONSIVE VENT

(75) Inventors: Paul Mark Marable, Rayleigh (GB); Tim Scott, Benfleet (GB); Allen Charles Bosio, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/562,400

(22) Filed: Jul. 31, 2012

(65) Prior Publication Data

US 2013/0033024 A1 Feb. 7, 2013

(30) Foreign Application Priority Data

Aug. 4, 2011 (GB) .................................. 1113411.1

(51) Int. Cl.
*B60R 21/239* (2006.01)
*B60R 21/30* (2006.01)

(52) U.S. Cl.
USPC .......................................... 280/738; 280/739

(58) Field of Classification Search
CPC .... B60R 21/239; B60R 21/276; B60R 21/30; B60R 2021/2395
USPC ........................... 280/730.1, 738, 739, 743.1
See application file for complete search history.

(56) References Cited

U.S. PATENT DOCUMENTS

| | | | | |
|---|---|---|---|---|
| 3,527,475 | A | 9/1970 | Carey et al. | |
| 5,310,215 | A * | 5/1994 | Wallner | 280/739 |
| 5,542,695 | A * | 8/1996 | Hanson | 280/729 |
| 7,398,992 | B2 * | 7/2008 | Marriott | 280/729 |
| 7,475,904 | B2 * | 1/2009 | Hofmann et al. | 280/739 |
| 7,475,906 | B2 * | 1/2009 | Goto et al. | 280/743.2 |
| 2003/0234528 | A1 | 12/2003 | Bohn et al. | |
| 2008/0079251 | A1 * | 4/2008 | Higuchi et al. | 280/742 |
| 2009/0045611 | A1 | 2/2009 | Kim | |
| 2009/0051144 | A1 | 2/2009 | Kai | |
| 2010/0140908 | A1 | 6/2010 | Abe | |
| 2011/0254256 | A1 * | 10/2011 | Mendez et al. | 280/743.2 |

FOREIGN PATENT DOCUMENTS

| | | | |
|---|---|---|---|
| EP | 1361120 | A2 | 11/2003 |
| FR | 2825054 | A1 | 11/2002 |
| JP | 2001277991 | A * | 10/2001 |

OTHER PUBLICATIONS

Intellectual Property Office, Search Report for corresponding GB Patent Application No. GB1113411.1 mailed Dec. 8, 2011.

* cited by examiner

*Primary Examiner* — Joseph Rocca
(74) *Attorney, Agent, or Firm* — Frank A. MacKenzie; Brooks Kushman P.C.

(57) ABSTRACT

An airbag has a fabric enclosure, a vent in the fabric enclosure, and a flow control device made up of a flexible membrane fastened around part of a periphery thereof to the fabric enclosure adjacent to the vent. The membrane defines a flow passage having a free end through which inflation gas is vented to atmosphere and has a tongue extending away from the free end. The tongue has a pre-deployment position in which it overlies an inner surface of the fabric enclosure and a distal end of the tongue extends past an end of the vent closest to the free end. A first distance from the distal end of the tongue to a closest end of the vent may be shorter than a second distance from the distal end of the tongue to a closest end of fastening between the periphery of the membrane and the fabric enclosure.

9 Claims, 4 Drawing Sheets

AIRBAG HAVING A PRESSURE RESPONSIVE VENT

CROSS-REFERENCE TO RELATED APPLICATIONS

This application claims foreign priority benefits under 35 U.S.C. §119(a)-(d) to GB 1113411.1 filed Aug. 4, 2011, which is hereby incorporated by reference in its entirety.

TECHNICAL FIELD

This invention relates to an airbag for a motor vehicle and in particular to the control the flow of gas from the airbag during deployment.

BACKGROUND

As shown in FIG. 1 it is known to provide a motor vehicle with a passenger airbag 1 having a fabric flexible enclosure 5 that is inflated when deployed by a gas generator (not shown) so as to provide protection for a passenger 6 of a motor vehicle. It is further known to provide a vent 7 in the fabric enclosure 5 to allow gas to escape from the fabric enclosure to limit the maximum pressure within the fabric enclosure and to allow gas to be ejected from the fabric enclosure 5 when the passenger 6 impacts against the airbag 1. It is a problem with such prior art designs that it is difficult to provide a vent 7 that restricts the outflow of gas sufficiently during deployment to prevent under inflation of the fabric enclosure 5 from occurring and yet is sufficiently large to allow gas to be ejected rapidly by the impacting passenger 6 to provide the required degree of compliance. It is a further problem with such prior art designs that hot gas flow from the vent 7 can impinge upon the passenger 6 as indicated by the arrow 'H' on FIG. 1.

SUMMARY

According to a first disclosed embodiment an airbag has a fabric enclosure, a vent in the fabric enclosure, and a flow control device comprising a flexible membrane fastened around part of a periphery thereof to the fabric enclosure adjacent to the vent. The membrane defines a flow passage having a free end through which inflation gas is vented to atmosphere and has a tongue extending away from the free end. The tongue has a pre-deployment position in which it overlies an inner surface of the fabric enclosure and a distal end of the tongue extends past an end of the vent closest to the free end.

In another embodiment, a first distance from the distal end of the tongue to a closest end of the vent is shorter than a second distance from the distal end of the tongue to a closest end of fastening between the periphery of the membrane and the fabric enclosure.

According to another embodiment, an airbag comprises a fabric enclosure, a vent in the fabric enclosure, and a flexible membrane fastened around part of a part thereof to an inner surface of the fabric enclosure adjacent to the vent to define a flow passage. The flow passage has a free end through which inflation gas is vented to atmosphere during inflation of the airbag. The airbag has a pre-deployment condition wherein a tongue portion of the membrane extending away from the free end overlies an inner surface of the fabric enclosure and a distal end of the tongue extends past an end of the vent closest to the free end. In a deployed condition of the airbag, internal pressure causes the membrane to extend outwardly through the vent.

BRIEF DESCRIPTION OF THE DRAWINGS

The invention will now be described by way of example with reference to the accompanying drawing of which.

DETAILED DESCRIPTION

Figure 1:
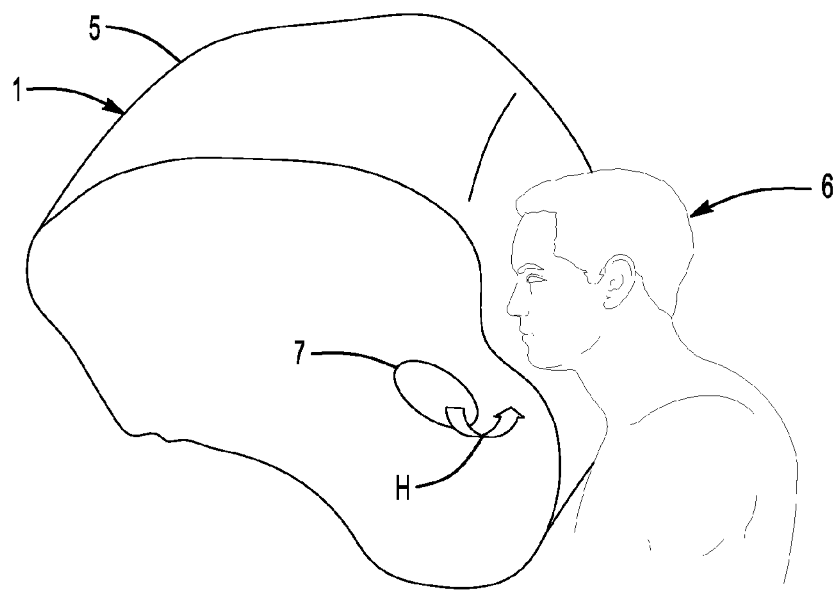
FIG. 1 is a pictorial representation of a prior art airbag in a deployed condition.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 2 to 5 of the drawing there is shown a passenger airbag 1 having a fabric enclosure in the form of a bag 5 and a gas generator (not shown) to inflate the bag 5. The bag 5 includes an impact surface 2 against which a user of the airbag 1 such as a passenger 6 is predicted to impact the airbag 1 during use.

The airbag 1 has an elongate side vent 17 to allow gas to escape from an interior of the bag 5 when the bag 5 is inflated during deployment of the airbag 1. It will be appreciated that the airbag 1 could also have a second vent on the opposite side of the airbag 1.

The flow through the vent 17 is controlled by a respective flow control device 10. The flow control device 10 is orientated so as to direct any gas exiting through the vent 17 to flow away from the predicted position of impact of the passenger 6. That is to say, the flow of gas is directed away from the passenger 6, as indicated by the arrow 'D' on FIG. 2.

The flow control device comprises a flexible membrane 10 formed from a gas impermeable or low permeability fabric that is fastened to an inner surface of the bag 5 so as to overlie the elongate vent 17. It will be appreciated that the invention is not limited to the use of fabric for the construction of the flow control device but it is the preferred material due to its availability and flexibility.

Figure 2:
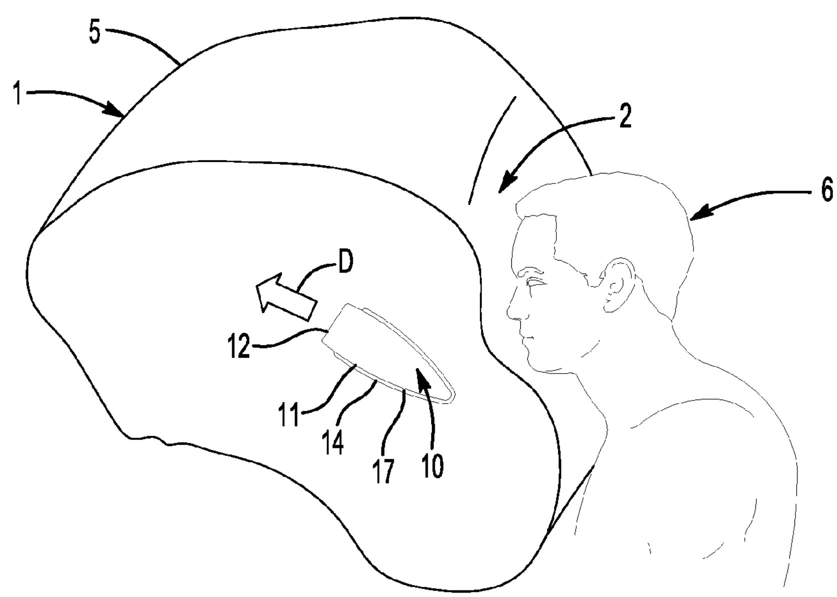
FIG. 2 is a pictorial of an airbag in a deployed state and a flow control device in accordance with a first disclosed embodiment in a fully activated state.
Figure 3:
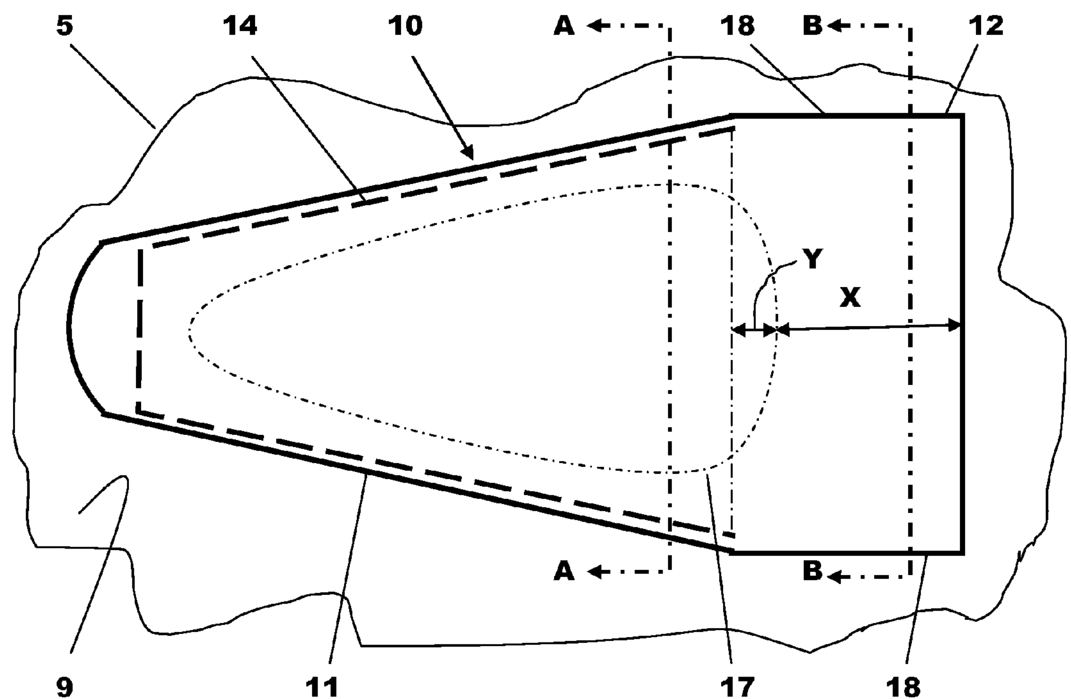
FIG. 3 is a schematic plan view of the flow control device according to the first disclosed embodiment showing the flow control device in a pre-activation state.
Figure 5:
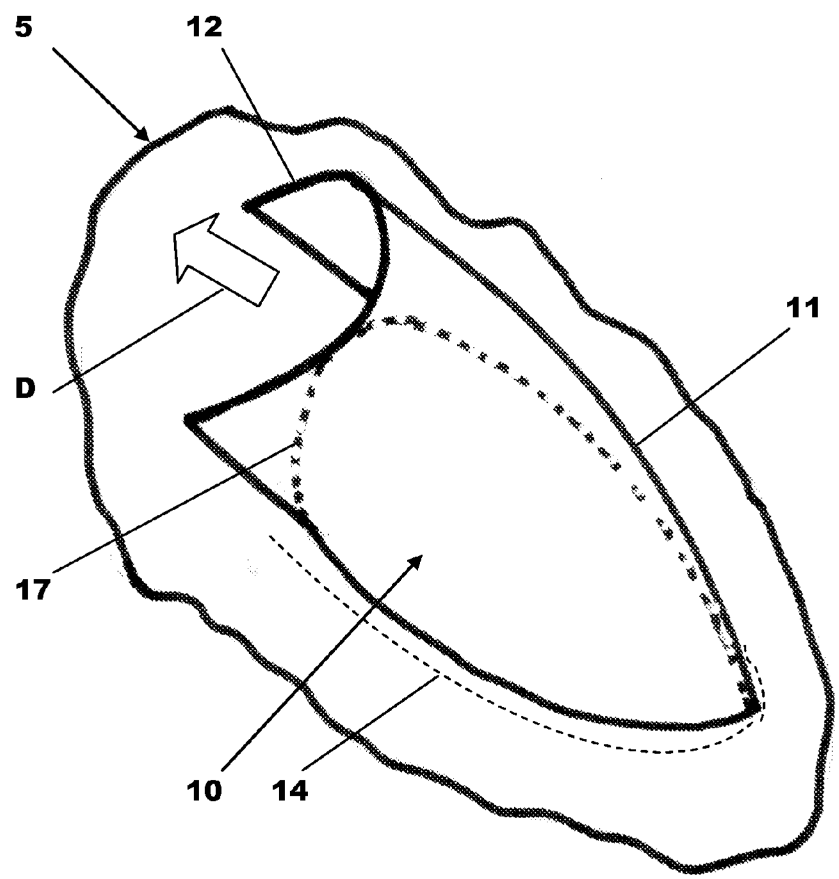
FIG. 5 is an enlarged pictorial of view of the flow control device shown in FIG. 2 in the fully activated state.

Although the vent 17 is of a teardrop shape as shown in FIGS. 2, 3 and 5 it will be appreciated that the vent may be of any shape appropriate for the particular airbag application.

The membrane 10 is secured to the inner surface of the bag 5 by a row of stitches 14 in a generally U-shaped pattern extending around the vent 17. The stitches 14 extend around part of the periphery of the membrane 10 so as to define a flow passage 11 that is connected at one end via the vent 17 to an interior of the bag 5 and has a free end through which gas from the interior of the bag 5 is selectively vented to atmosphere as described in more detail hereinafter. The width of the membrane material between the locations where it is fastened by means of the stitches 14 is greater than the linear distance between the stitches 14 on opposite sides of the flow passage 11 so as to provide sufficient free material to inflate to form the flow passage 11 when the airbag 1 is deployed.

It will be appreciated that the membrane 10 could be permanently fastened to the inner surface 9 of the bag 5 by means other than stitching and that the invention is not limited to the use of stitching.

The membrane 10 also has an end flap portion or tongue 12 extending away from the free end of the flow passage 11 such that, when the membrane is in the pre-deployment condition, the tongue overlies an inner surface 9 of the bag 5. The pre-deployment condition is when the airbag is folded, rolled, and/or otherwise compacted to place it in its stored condition within an airbag housing (not shown).

The tongue 12 has two longitudinal edges 18 and extends a distance 'X' from the closest end/edge of the vent 17. The magnitude of the distance 'X' determines the time delaying properties of the flow control device, the greater the distance 'X' the longer will it take to achieve full activation of the flow control device. That is to say, if the tongue 12 is longer it will take a longer period of time for it to be drawn out fully through the vent 17.

The pressure required to cause opening of the flow control device may be adjusted to a desired level by varying the position of the end of the fastening (the last stitch 14, in the depicted embodiment) on each side of the flow passage 11 relative to the closest end/edge of the vent 17. In general terms, if the distance 'Y' from where the furthest extend of the fastening/stitching to the closest end of the vent 17 is increased the less pressure is required to activate the flow control device. The width between the fastening/stitches 14 on opposite sides of the vent 17 adjacent that position also may be used to control the venting of the airbag: if the width between the fastening/stitches 14 is increased then the pressure required to activate the flow control device is reduced.

In the example shown, no means are used to fasten or secure the tongue 12 to the inner surface 9 of the bag 5 it merely lays against the inner surface 9 of the bag 5. However, it will be appreciated that it could be attached by a frangible connection in order to temporarily hold it in position or to further increase the time taken to activate the flow control device or increase opening pressure.

It will be appreciated that the shape of the tongue 12 is not limited to a rectangle and that the tongue 12 could be of a different shape to that shown.

Figure 6A:
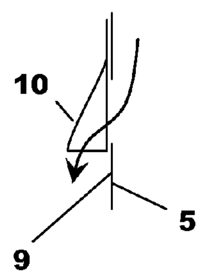
FIG. 6A is a diagrammatic side view of the flow control device during an inflation phase of airbag deployment.
Figure 6B:
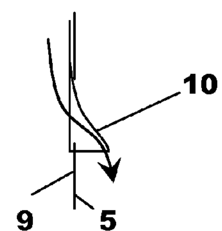
FIG. 6B is a diagrammatic side view of the flow control device following impact of a passenger with the airbag.
Figure 4A:
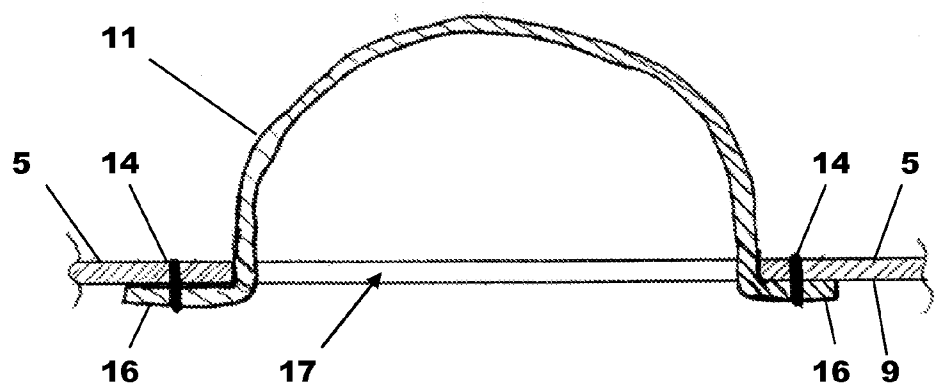
FIG. 4A is a scrap cross-section along the line A-A on FIG. 3 showing the flow control device in the fully activated state.
Figure 4B:
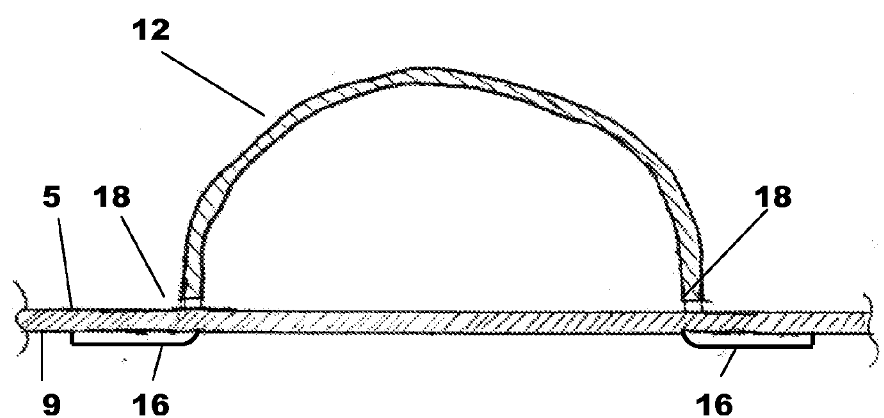
FIG. 4B is a scrap cross-section along the line B-B on FIG. 3 showing the flow control device in the fully activated state.

In the embodiment shown and described above, all of the membrane 10 is located within the bag 5 prior to deployment of the airbag 1. However, it will be appreciated that it would be possible to fasten the part of the membrane forming the flow passage to an outer surface of the bag 5 and tuck the tongue 12 into the vent 17 so as to lie against the inner surface 9 of the bag 5. Nevertheless, it is preferred to fasten the membrane 10 within the bag 5 as shown in FIGS. 2 to 5 because it can then freely move to an aspiration position wherein it is spaced from the inner surface 9 of the bag 5 during inflation of the bag 5 to allow air to flow into the bag 5 (as shown diagrammatically in FIG. 6A), or alternatively move to a venting position wherein it allows gas to flow out of the bag when the pressure exceeds a pre-determined level (as shown diagrammatically in FIG. 6B).

In some airbags a vacuum can form in fabric enclosure during the deployment of the airbag due to the fact that the fabric enclosure is expanded rapidly from its containment producing an enclosure volume greater than the volume of gas that has so far been produced by the gas generator. This internal vacuum can cause temporary, localized collapsing of the fabric enclosure which may interfere with normal deployment. For example, in the case of a two chamber airbag in which a secondary chamber is filled via a vent from a primary chamber, the locally collapsed material may block the vent joining the two chambers so as to prevent correct filling of the secondary chamber. The ability of the flow control device to freely move to the aspiration position to thereby allow air to flow into the bag 5 when a negative pressure is generated within the bag 5 overcomes such problems.

Operation of the flow control device is as follows.

When the airbag 1 is first deployed gas is produced by the gas generator which begins to fill the bag 5 until it is fully inflated to a pressure (such as for example 20 to 30 kPa) which is below a designed vent-opening pressure (of, for example, 35 kPa). If there is no impact against the bag 5 during this period of time then the vent 17 will remain closed due to the overlying membrane. That is to say, the vent 17 does not open when a non-impact level of pressure is generated within the bag 5, but rather the tongue 12 remains inside of the bag 5 to seal off vent opening. In other embodiments the flow control device can be arranged to open when a normal or desired filling pressure is reached and in this case the designed vent-opening pressure would be equal to the required bag filling pressure.

If during deployment, a passenger 6 impacts against the bag 5 then this will increase the pressure within the bag 5 beyond the designed vent-opening pressure and the flow control device will be activated to allow pressure to be released from the bag 5. Activation of the flow control device occurs when the flow passage 11 inflates outwardly from the fabric enclosure to such an extent that it begins to pull or draw the tongue 12 out through the vent 17. As soon as the position where the tongue 12 is released through the vent 17 so as to be positioned outside of the bag 5 the gas pressure acts directly against the tongue 12 and a small amount of gas can begin to leak or escape from the bag 5. This leakage will continue to increase until eventually the tongue 12 is fully released through the vent 17 at which point gas is free to escape from the flow passage 11 to atmosphere.

Similarly, when the airbag 1 is fully deployed and a passenger 6 impacts against the bag 5, this will also increase the pressure within the bag 5 beyond the designed opening pressure of 35 kPa and the flow control device is activated to allow pressure to be released from the bag 5. Activation of the flow control device occurs when, as before, the inflation of the flow passage 11 pulls or draws the tongue 12 out through the vent 17 and, in later stages of airbag inflation, the direct action of the gas pressure against the tongue 12.

As before, when the end of the tongue 12 where it is joined to the free end of the flow passage 11 is released through the vent 17 so as to be positioned outside of the bag 5, a small amount of gas can begin to leak or escape and this leakage will continue to increase until eventually the tongue 12 is fully released through the vent 17 at which point gas is free to escape from the flow passage 11 to atmosphere.

In both cases, when the flow control device is activated the release of gas is a gradual up-ramping process compared to the instantaneous release of gas that occurs if the vent is suddenly fully exposed. Furthermore the time required to pull the tongue 12 out of the vent 17 delays the release of gas by a short period of time (such as, for example, 5 to 10 ms) which ensures that the bag 5 does not collapse too quickly after the vent 17 begins to open.

As the pressure in the bag 5 begins to fall following full activation of the flow control device the flow passage 11 will begin to collapse and this partially restricts the outflow of gas from the bag 5 thereby slowing the loss of pressure from within the bag 5.

In the disclosed structure, because the tongue 12 is not fastened to the bag 5 the pressure required to open the vent 17 is much lower than is the case where a frangible fastening means must be broken to release the flap.

It will be appreciated that the opening properties of the flow control device can be varied by using materials of differing stiffness to form the membrane.

It will be appreciated that the disclosed structure can be applied with advantageous effect to airbags having a single chamber or to airbags having multiple chambers.

It will also be appreciated that the disclosed structure could be applied to a vent linking two chambers where a secondary chamber is filled from a primary chamber via the vent.

Therefore in summary the disclosed structure provides a means for controlling the flow of gas from a vent of an airbag that is of simple and cost-effective construction and provides a number of innovative features. For example, by fastening the membrane to an inner surface of the bag, the bag is self-aspirating and a vacuum will not be generated during inflation of the bag.

The flow control device can be arranged to open when a required full inflation pressure is reached or only when an occupant impacts against the bag.

The outflow of any hot or otherwise undesirable gas from the bag is directed away from a user of the bag by the flow passage.

A large surface area of the membrane may be exposed to the gas pressure allowing the use of a low pressure to activate the flow control device.

The flow control device is tunable for opening time by varying the dimensions of the tongue.

The release of gas is a gradual up-ramping not a sudden step change in pressure loss.

The vent area is independent of the flow area of the flow passage.

The flow control device will tend to close when the bag pressure falls thereby increasing the working time of the bag.

The pressure required to open the flow control device can be increased in a simple manner by using a frangible fastening between the tongue and the bag such as a tear stitch or an adhesive patch.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag having a fabric enclosure, a vent in the fabric enclosure, and a flow control device comprising:

a flexible membrane fastened around part of a periphery of the membrane to the fabric enclosure adjacent to the vent to define a flow passage having a free end through which inflation gas is vented to atmosphere, the membrane having a tongue extending away from the free end and the tongue having a pre-deployment position in which it overlies an inner surface of the fabric enclosure and a distal end of the tongue extends past an end of the vent closest to the free end, the distal end being unrestrained against movement away from contact with the inner surface of the fabric enclosure such that the membrane is movable to an aspiration position wherein the tongue is spaced from the inner surface of the fabric enclosure; wherein a first distance from the distal end of the tongue to a closest end of the vent is shorter than a second distance from the distal end of the tongue to a closest end of fastening between the periphery of the membrane and the fabric enclosure.

2. The airbag of claim 1 wherein the periphery of the membrane is fastened to the inner surface of the fabric enclosure.

3. The airbag of claim 1 wherein the membrane is fastened to the fabric along an approximately U-shaped pattern around the vent.

4. The airbag of claim 1 wherein the membrane is made from one of a gas impermeable fabric and a low permeability fabric.

5. The airbag of claim 1 wherein, when the airbag is deployed, the tongue is pulled by the inflation of the flow passage through the vent.

6. The airbag of claim 5 wherein the tongue restricts gas flow through the flow passage until the tongue is pulled through the vent.

7. The airbag claim 1 wherein the membrane is attached to the fabric enclosure with the flow passage oriented to direct gas flow away from a predicted position of impact of a user of the airbag.

8. An airbag comprising:

a fabric enclosure;

a vent in the fabric enclosure; and a flexible membrane fastened around part of a periphery of the membrane to an inner surface of the fabric enclosure adjacent to the vent to define a flow passage having a free end through which inflation gas is vented to atmosphere during inflation of the airbag, the airbag having a pre-deployment condition wherein a tongue portion of the membrane extending away from the free end overlies an inner surface of the fabric enclosure and a distal end of the tongue extends past an end of the vent closest to the free end, the distal end being unrestrained against movement away from contact with the inner surface of the fabric enclosure such that the membrane is movable to an aspiration position wherein the tongue is spaced from the inner surface of the fabric enclosure, and the membrane is alternatively movable to a venting position wherein internal pressure causes the membrane to extend outwardly through the vent; wherein a first distance from the distal end of the tongue to a closest end of the vent is shorter than a second distance from the distal end of the tongue to a closest end of fastening between the periphery of the membrane and the fabric enclosure.

9. The airbag of claim 8 wherein the membrane is fastened to the enclosure along an approximately U-shaped pattern around the vent.

* * * * *